(12) United States Patent
Niu

(10) Patent No.: US 9,811,508 B2
(45) Date of Patent: Nov. 7, 2017

(54) METHOD AND APPARATUS FOR HIERARCHICAL DATA READING

(71) Applicant: Tencent Technology (Shenzhen) Company Limited, Shenzhen (CN)

(72) Inventor: Ming Niu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 600 days.

(21) Appl. No.: 14/483,039

(22) Filed: Sep. 10, 2014

(65) Prior Publication Data

US 2015/0026550 A1 Jan. 22, 2015

Related U.S. Application Data

(63) Continuation of application No. PCT/CN2014/082120, filed on Jul. 14, 2014.

(30) Foreign Application Priority Data

Jul. 16, 2013 (CN) .......................... 2013 1 0298055

(51) Int. Cl.
*G06F 17/22* (2006.01)
*G06F 17/30* (2006.01)

(52) U.S. Cl.
CPC ...... *G06F 17/2235* (2013.01); *G06F 17/2241* (2013.01); *G06F 17/3089* (2013.01); *G06F 17/30899* (2013.01); *G06F 17/30902* (2013.01)

(58) Field of Classification Search
CPC ..................... G06F 17/30902; G06F 17/30899
See application file for complete search history.

(56) References Cited

U.S. PATENT DOCUMENTS 7,130,890 B1* 10/2006 Kumar ................ H04L 67/2847
707/999.01
7,747,749 B1* 6/2010 Erikson ............. G06F 17/30902
709/219

(Continued)

OTHER PUBLICATIONS

Tencent Technology, ISRWO, PCT/CN2014/082120, dated Oct. 22, 2014, 6 pgs.

(Continued)

*Primary Examiner* — Mohammed-Ibrahim Zuberi
(74) *Attorney, Agent, or Firm* — Morgan, Lewis & Bockius LLP

(57) ABSTRACT

Method and device of presenting data stored at remote source are disclosed. The method includes: receiving first webpage data that is configured to be rendered as a first webpage, the first webpage, when rendered, provides one or more access links each directed to respective second webpage data that is stored at a respective remote source; from the first webpage data, recognizing respective reference data for each of the respective second webpage data; in accordance with the respective reference data, requesting the respective second webpage data from its respective remote source; receiving and storing at least one of the respective second webpage data before detecting the user's selection of the access link; and upon detecting the user's selection of the access link, rendering the stored at least one of the respective second webpage data as a second webpage.

20 Claims, 5 Drawing Sheets

(56) References Cited

U.S. PATENT DOCUMENTS

| | | |
|---|---|---|
| 2005/0203884 A1 | 9/2005 | Allen et al. |
| 2009/0063530 A1 | 3/2009 | Lee et al. |
| 2012/0151308 A1* | 6/2012 | Falkenberg ....... G06F 17/30899 715/201 |
| 2012/0254780 A1* | 10/2012 | Mouton .............. G06F 3/04883 715/765 |
| 2013/0036157 A1 | 2/2013 | Toupin |
| 2013/0073509 A1* | 3/2013 | Burkard ............ G06F 17/30864 706/52 |
| 2013/0304798 A1* | 11/2013 | Chang ....................... G06F 9/54 709/203 |
| 2014/0095966 A1* | 4/2014 | Burkard ............ G06F 17/30902 715/205 |
| 2014/0372511 A1* | 12/2014 | Kapadia .................. H04L 67/02 709/203 |
| 2015/0195156 A1* | 7/2015 | Agrawal ........... G06F 17/30893 709/224 |
| 2015/0195329 A1* | 7/2015 | Jain ................... G06F 17/30864 709/219 |

OTHER PUBLICATIONS

Tencent Technology, IPRP, PCT/CN2014/082120, dated Jan. 19, 2016, 4 pgs.

\* cited by examiner

| Section | Task | Ordered | Performed | Expectancy |
|---|---|---|---|---|
| North China | 60500 | 62938 | 49528 | 68901 |
| East China | 94000 | 52967 | 36148 | 56856 |
| South China | 49500 | 57119 | 37882 | 64412 |

FIG. 1

| Select |
|---|
| Data format |
| Dollar |
| Percentage |
| Time range |
| 2013 Q1 |
| 2013 Q2 |

FIG. 2

| Director | Task | Ordered | Performed | Expectancy |
|---|---|---|---|---|
| Michael Chen | 31300 | 24298 | 28241 | 29521 |
| E Meng | 17000 | 12175 | 7983 | 12325 |
| Han Liang | 12200 | 16953 | 13393 | 17567 |

Receiving an initialization request that includes elements to be read, sending a data reading request to a read-server, wherein the data reading request includes elements to be read, elements on the same layer and the lower level with respect to the elements to be read

402

Receiving and saving the feedback data from the read-server, the saved data include the data corresponding to the elements to be read, the data corresponding to the elements on the same layer and the lower level with respect to the elements to be read

403

Displaying the data corresponding to the elements to be read

FIG. 4

| Group | Task | Ordered | Performed | Expectancy |
|---|---|---|---|---|
| Household | 15000 | 17456 | 13091 | 19148 |
| Home appliances | 7300 | 5946 | 2837 | 8481 |
| Finance | 8500 | 10005 | 8848 | 10207 |
| Games | 3500 | 4888 | 4763 | 5464 |

FIG. 5

| Member | Task | Ordered | Performed | Expectancy |
|---|---|---|---|---|
| AAA | 60500 | 62938 | 49528 | 68901 |
| BBB | 94000 | 52967 | 36148 | 56856 |
| CCC | 49500 | 57119 | 37882 | 64412 |
FIG. 6
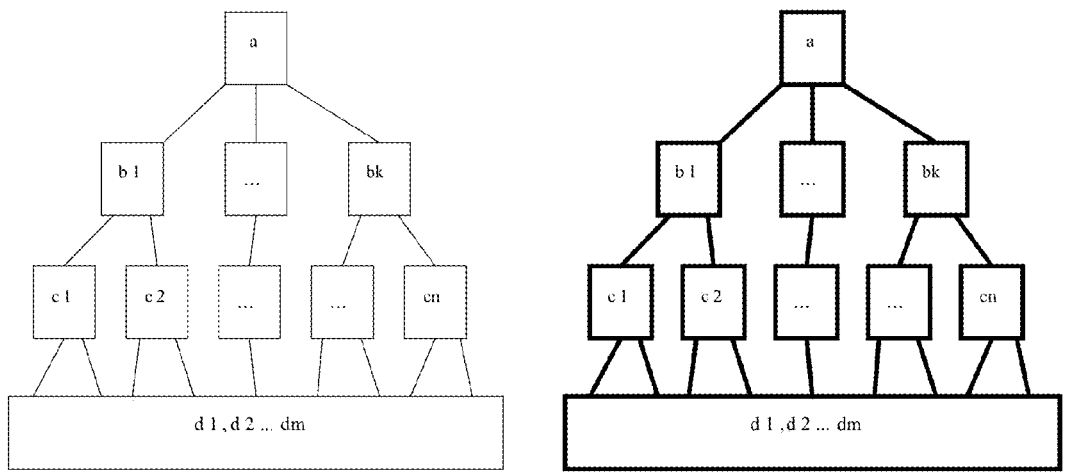
FIG. 7
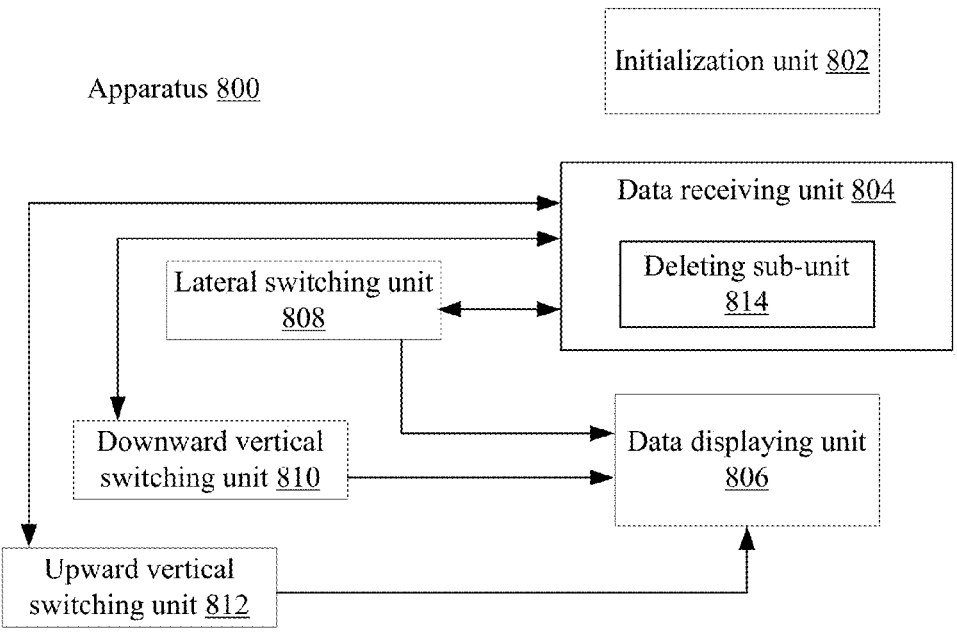
FIG. 8

METHOD AND APPARATUS FOR HIERARCHICAL DATA READING

PRIORITY CLAIM AND RELATED APPLICATIONS

This application is a continuation application of PCT Patent Application No. PCT/CN2014/082120, entitled "METHOD AND APPARATUS FOR HIERARCHICAL DATA READING" filed on Jul. 14, 2014, which claims priority to Chinese Patent Application No. 201310298055.0, entitled "METHOD AND APPARATUS FOR HIERARCHICAL DATA READING" filed on Jul. 16, 2013, both of which are incorporated by reference in their entirety.

TECHNICAL FIELD

The disclosed implementations relate generally to the field of data processing technology, and in particular, to method and apparatus for hierarchical data reading.

BACKGROUND

Nowadays, when internet users, especially smart phone users, travel, they will encounter connection conditions with various bandwidth and stability. It is desirable to provide users with a method of browsing the Internet smoothly even under low bandwidth or unstable internet connections.

Conventionally, the technology for a user accessing a database server via queries based on various combinations of parameters through a web server. In a regular web interface, user interface elements can be provided to make the access more easily. Sometimes, entire data is downloaded immediately based on the user's access authority without regard to the user's actual query or selection on the web interface. Sometimes, each subset of data is only downloaded after the user has specifically requested the subset of data using the selection or input elements on the web interface. Both methods have drawbacks. The first method is inefficient and provides bad user experience on slow network connections, and the second method requires the user to wait for the data download for each user request. A more efficient and user friendly way of retrieving data from database servers and/or web servers is needed.

SUMMARY

The present disclosure provides techniques for accessing hierarchical data from remote source(s) that may address the above shortcomings of existing techniques.

In accordance with some implementations of the present application, a method of presenting data stored at remote sources is disclosed. The method includes: receiving first webpage data that is configured to be rendered as a first webpage, the first webpage, when rendered, provides one or more access links each directed to respective second webpage data that is stored at a respective remote source; from the first webpage data, recognizing respective reference data for each of the respective second webpage data that is stored at its respective remote source; in accordance with the respective reference data for each of the respective second webpage data, requesting the respective second webpage data from its respective remote source before detecting a user's selection of the access link directed to the respective second webpage data in the first webpage; receiving and storing at least one of the respective second webpage data before detecting the user's selection of the access link directed to the at least one of the respective second webpage data in the first webpage; and upon detecting the user's selection of the access link directed to the at least one of the respective second webpage data in the first webpage, rendering the stored at least one of the respective second webpage data as a second webpage.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF DRAWINGS

The aforementioned implementations as well as additional implementations will be more clearly understood as a result of the following detailed description of the various aspects of the technology when taken in conjunction with the drawings. Like reference numerals refer to corresponding parts throughout the several views of the drawings.

FIG. 1 shows an example of section data in hierarchical data reading;

FIG. 2 shows an example of page switching in hierarchical data;

FIG. 3 shows an example of hierarchical data;

FIG. 4 shows a schematic flow chart for the method of presenting data stored at remote sources in accordance with some embodiments;

FIG. 5 shows an example of hierarchical data reading in accordance with some embodiments;

FIG. 6 shows an example of in hierarchical data reading in accordance with some embodiments;

FIG. 7 shows an example of a tree-structure of elements in hierarchical data reading in accordance with some embodiments;

FIG. 8 shows a structure block diagram of the apparatus for hierarchical data reading in accordance with some embodiments;

DETAILED DESCRIPTION

Figure 9:
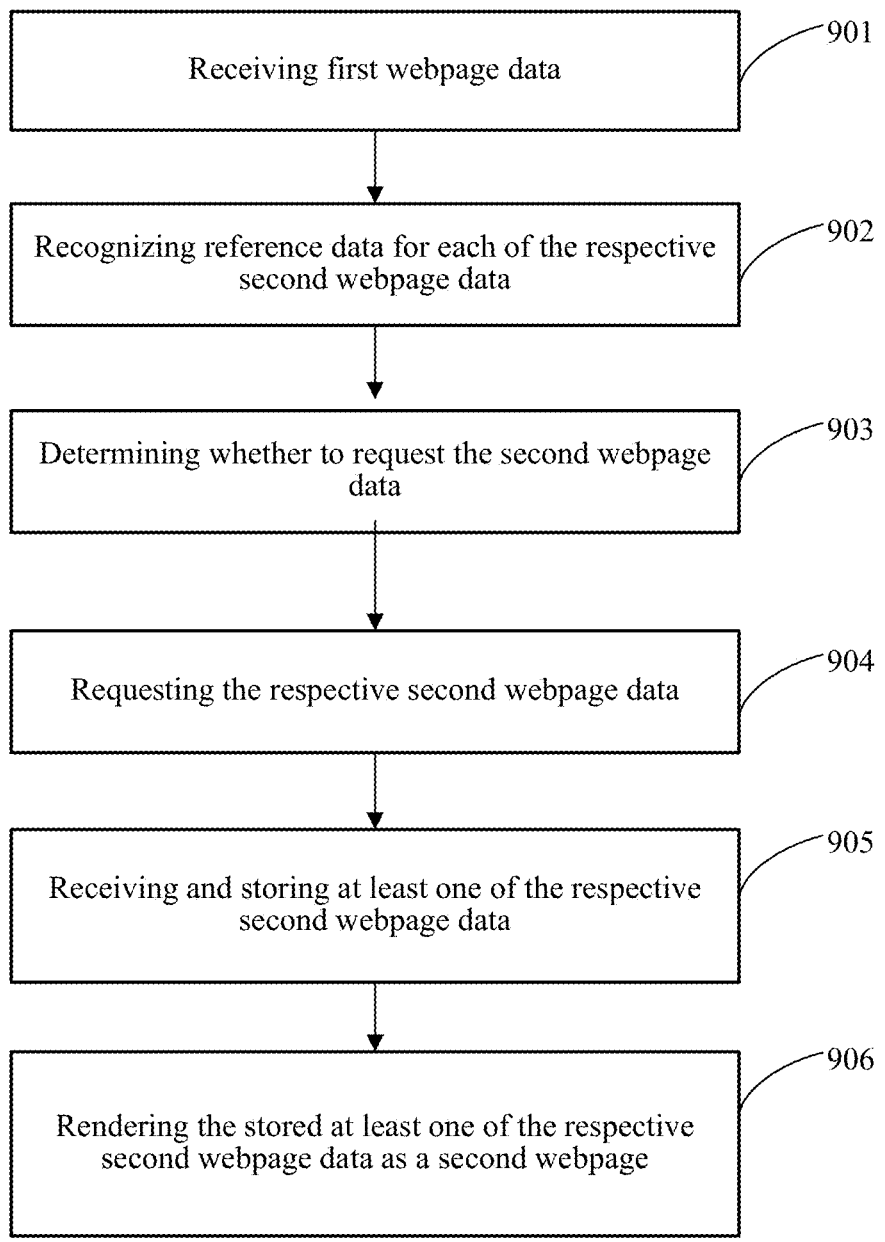
FIG. 9 is a flowchart of a method of presenting data stored at remote sources in accordance with some embodiments.

User terminals can get access to hierarchical data from an acquisition server on the network side. For example, sometimes, hierarchical data includes two horizontal layers with four vertical levels. The two layers include two time periods: the first quarter (Q1) of 2013 and the second quarter (Q2) of 2013. The first level, the second level, the third level and the fourth level are respectively section data, director data corresponding to each section, group data corresponding to each director and individual data corresponding to each group.

Initially the user enters a hierarchical reading page in which an element is determined according to the user's access authority, this element is an element to be read. Suppose the user is authorized to query data from all sections with the default time period being the second quarter, the determined element will be the section in 2013Q2. The user terminal will display the data of all sections in 2013 Q2, with the assumption that there are three sections including North China, East China and South China. FIG. 1 shows the performance data from each section for the 2013Q2 displayed by the user terminal, in which every corresponding amount of money is shown. The user can switch the time period displayed on the upper right corner of the page, so as to read the data from each section for 2013Q1, as shown in FIG. 2. Moreover, the user can view the data by levels, for example, the user clicks a certain section so as to view each director data corresponding to this section, and then he/she clicks a certain director so as to view each group data corresponding to this director, further he/she clicks a certain group so as to view each member data corresponding to this group.

When need to see data, the user is presented with a hierarchical reading page, which acquires required data from a read-server to display. During the process of getting data from the read-server, the user terminal displays a welcome page; after getting the data, it jumps to a data displaying page. Presently there are mainly two ways for hierarchical reading, which will be respectively explained below.

The first way:

The read-server gets the data that requested by the user and send it to the user terminal. It has an advantage in this way that the amount of data flow is smaller and the response time for reading the data is shorter. However, the disadvantage is that it needs to acquire data from the read-server after inputting a reading request each time, which is a burden to the network performance. For example, in the case that the user enters the home page and request the data of section 2013 Q2, the read-server will feedback the data with respect to section in 2013Q2 to the user terminal for display, as shown in FIG. 2. Afterwards, if the user clicks "North China", it requests data of director of North China in 2013Q2 from the read-server, and the page for director of North China is presented, the data of director of North China is shown in FIG. 3.

The second way:

All data related to what the user requests will be extracted. It has an advantage in this way that the need of data requesting from the user in the subsequent switching pages is eliminated. For example, in the case that the user enters the home page and request the data of section 2013Q2, the read-server will feedback all of the data with respect to section in 2013Q2 to the user terminal, then the user terminal stores the receiving data and displays the data of section 2013Q2. Said all data with respect to section 2013Q2 include all data of section of 2013Q2+director+group+individual, that is including: data of 2013Q2 that covering three sections including North China+East China+South China, the data of the directors respectively corresponding to the three section including North China+East China+South China, the data of the groups corresponding to each director, the data of the individual corresponding to each group. In this way, subsequently, when the user requests the data of lower level, the user terminal can directly extract the required data from local and display. However, there is a disadvantage that the amount of the requesting data flow is large, which extends the waiting time in the welcome page. Moreover, in most cases the user only switches between two pages, which means that he/she subsequently requests for data one more time, in such cases it will be a waste of resource to put the remaining unused data into the cache. Moreover, when the user needs to read the data of 2013Q1, it is needed to switch the time period displayed on the upper right corner of the page to acquire data from the server again.

Therefore there are disadvantages in both ways. If the advantages of these two ways can be combined, such that the data reading speed is increased as much as possible, and the waste of cache resources is reduced.

In practice, an initialization request is typically followed by one reading request. If only acquiring and saving the current requested data, the data on the same layer as well as the data on the lower level, after receiving the initialization request, the advantage of said first way and second way can be taken and the disadvantage can be eliminated, such that the performance is improved while the data reading speed is increased as much as possible, and the waste of cache resources is reduced.

FIG. 4 shows a schematic flow chart for a method of hierarchical data reading in accordance with some embodiments, the method includes the following steps:

In accordance with some embodiments, in step 401, a user terminal receives an initialization request that includes elements to be read, sending a data reading request to a read-server, wherein the data reading request includes elements to be read, elements on the same layer and the lower level with respect to the elements to be read.

Initially the user enters a hierarchical reading page, in which an element is determined according to the user's authority, this element is an element to be read. Suppose the user is authorized to query data from all sections with the default time period being the second quarter, the determined element will be the section in 2013Q2. Again for example the user is Director Michael Chen, and the time period is default as the second quarter, then the determined element is 2013Q2 Michael Chen.

In accordance with some embodiments, in step 402, the user terminal receives and saves the feedback data from the read-server, the saved data includes the data corresponding to the elements to be read, the data corresponding to the elements on the same layer and the lower level with respect to the elements to be read.

In accordance with some embodiments, in step 403, the user terminal displays the data corresponding to the elements to be read.

Afterwards, it is also possible that the user terminal receives a switching request input by the user, so as to switch data, as explained respectively below.

1. Lateral switching includes the following steps performed by a user terminal:

Receiving a lateral switching request, which includes lateral elements that selected from the elements on the same layer with the elements to be read; querying whether data corresponding to the lateral elements are stored, if yes, extracting the data to display, and sending a lateral reading request to the read-server, which includes elements on the lower level below the lateral elements, and not including elements with locally stored correspondent data; and Receiving and saving the data that fed back from the read-server.

If there are no locally stored data corresponding to the lateral elements, a lateral reading request is directly sent to the read-server. The lateral reading request includes the lateral elements, the elements on the lower level and not including elements with locally stored correspondent data; receiving and saving the data that fed back from the read-server, and display the data corresponding to the lateral elements.

2. Downward vertical switching includes the following steps performed by a user terminal:

Receiving a downward vertical switching request, which includes downward vertical elements that selected from the elements on the lower level below the elements to be read; querying whether data corresponding to the downward vertical elements are stored, if yes, extracting the data to display, and sending a downward vertical reading request to the read-server, which includes the elements on the same layer and elements on the lower level below the downward vertical elements, and does not include elements with locally stored correspondent data; and Receiving and saving the data that fed back from the read-server.

If there are no locally stored data corresponding to the downward vertical elements, a downward vertical reading request is directly sent to the read-server. The downward vertical reading request includes the downward vertical elements, the elements on the same layer and the elements on the lower level below the downward vertical elements, and not including elements with locally stored correspondent data. Receiving and saving the data that fed back from the read-server, and display the data corresponding to the downward vertical elements.

3. Upward vertical switching includes the following steps performed by a user terminal: Receiving an upward vertical switching request, which includes upward vertical elements that selected from the elements on the higher level above the elements to be read; querying whether data corresponding to the upward vertical elements are stored, if yes, extracting the data to display, otherwise, rejecting the switching request.

Finally, if the user exits from the hierarchical reading page, the user terminal will delete all the stored data that relate to the application on the page.

The technical solution in accordance with some embodiments will be explained with reference to an example of two layers-four levels as shown in FIG. 1-3. The two layers in the example are two time periods including the first quarter (Q1) and second quarter (Q2) in 2013, the four levels are section, director, group and individual, in turn.

The user enters a web application via a mobile phone or tablet PC and sees a welcome page. After the data is loaded, the page for a section is shown in default, which displays the section data of the current quarter (2013Q2) as shown in FIG. 1. According to the tips shown on the upper right corner of the page on each level, the time range (2013Q1 and 2013Q2) of the data can be switched as shown in FIG. 2.

In step 1, a welcome page will be shown after the Web application is started, the user terminal requests 3 pieces of data (section in 2013Q2+section in 2013Q1+director in 2013Q2) from the read-server, the data is returned and saved in the memory of the user terminal in a json format. The js framework of the user terminal extracts and presents the section data in 2013Q2, as shown in FIG. 1.

Now the json data of the user terminal exactly include only all the possibilities for the user switching a page next time. This means, after the user views the section data in 2013Q2, the secondly requested data are certainly within these two items (section in 2013Q1+director in 2013Q2). Therefore, when the user enters the next page, he/she does not need to wait for requesting data. And the range of requested data is the minimum.

In step 2, supposing the user clicks "North China" on the page, he/she enters the page for the director of North China in 2013Q2. The web application then directly extracts and presents the director data of North China in 2013Q2. Meanwhile, the web application sends a request to the read-server, extracting two pieces of data (the director of North China in 2013Q1+the groups of North China in 2013Q2) and adding them into the memory of the user terminal. The director data of North China are shown in FIG. 3.

The advantages of this step are: 1. when jumping to the sub-page, the data are acquired from the memory, so that the speed of response is fast; and 2. extracting the director data in 2013Q1 and the group data of North China in 2013Q2 ensure the data in the memory including all the possibilities of page changes by the user next time, so as to make a preparation for the user to make the next change. Because the current page is the page for the director of North China in 2013Q2, only the group data of North China in 2013Q2 are further extracted but not all groups in 2013Q2, in order to reduce data storage. Some other steps have similar advantages and will not be repeated.

In step 3, if the user clicks "Michael Chen" in FIG. 3, he/she enters the page for director Michael Chen's groups of North China in 2013Q2, and the web application directly extracts and presents the group data of director Michael Chen of North China in 2013Q2. At the same time, a request is sent to the server, to extract two pieces of data (director Michael Chen's groups of North China in 2013Q1+the group member of director Michael Chen's groups of North China in 2013Q2) and add them into the memory of the user terminal. The group data of director Michael Chen of North China are shown in FIG. 5.

In step 4, if the user clicks "Home appliances" in FIG. 5, he/she enters the page for the group members in director Michael Chen's Home appliances group of North China in 2013Q2, and the web application directly extracts and presents the data of the group members in director Michael Chen's Home appliances group of North China in 2013Q2. At the same time, a request is sent to the server, to extract one piece of data (the group members in director Michael Chen's Home appliances group of North China in 2013Q1) and add it into the memory of the user terminal. The data of the group members in director Michael Chen's Home appliances group are shown in FIG. 6.

In step 5, now turn back to step 1, the current page is the page for the section 2013Q2, if the user switches the time range to 2013Q1, then he/she enters the page for section 2013Q1. The web application directly extracts and presents the section data in 2013Q1. Meanwhile it sends a request to the server to extract one piece of data (the director data in 2013Q1) and add this data into the memory of the user terminal.

Steps 1-5 already cover all the scenes for the user to click and switch. In some embodiments, the core concept of the technical solution lies in that the data is always cached one step ahead of the user. By using the technical solution of hierarchical data structure in accordance with some embodiments, the data are regularly loaded to the user terminal in successive steps, such that the performance of an application can be improved while wasting the resource can be reduced, and the waiting time for data request can be reduced for the user.

From the above examples of data structure, three features of the data structure could be concluded as below.

1. The data from top to bottom form a complete tree structure (section-director-group-individual).

2. The data in the entire system could form one tree, also they could form N parallel trees, N>=1 (2013Q2 and 2013Q1 are two trees).

3. Switching the data at a time could only move one step laterally or vertically from the current position, without skipping.

FIG. 7 shows an example of the data structure in accordance with some embodiments, where the data structure includes two trees that marked with a thin solid line and heavy line respectively.

(1) It is assumed that the home page displays the data in the thin solid line on the welcome page, three pieces of data are then requested to receive from the server (thin solid line a+heavy line a+thin solid line b1 to bk) and saved in the memory. Now the data in the memory exactly include only all the possibilities for the user to change next time.

(2) If the user switches from the thin solid line a to the thin solid line b1, the data in the thin solid line b1 is directly extracted from the memory and presented, meanwhile two pieces of data (heavy line b1+thin solid line c1 to c2) are requested and saved in the memory. Now the data in the memory also include only all the possibilities for the user to change next time.

(3) If the user switches from the thin solid line b1 to the heavy line b1, the data in the heavy line b1 is directly extracted from the memory and presented, meanwhile one piece of data (heavy line c1 to c2) is requested and saved in the memory. Now the data in the memory also include only all the possibilities for the user to change next time. As a matter of fact, two pieces of data (thin solid line b1+heavy line c1 to c2) would have to be extracted, however the web application detects prior to data requesting that there have been data of thin solid line b1 in the memory, therefore only one piece of data (heavy line c1 to c2) is needed to be requested, in order to reduce unnecessary data as far as possible.

(4) If the user continues to switch vertically downward, the operation of step (2) is repeated; if the user switches laterally, the operation of step (3) is repeated; if the user switches vertically upward, the target data is directly extracted from the memory and presented, without further data requesting.

(5) Prior to each data requesting, the user terminal checks whether the data exists in the memory. If a certain data exists, it will not request again in order to reduce resource waste.

FIG. 8 shows an apparatus 800 for hierarchical data reading in accordance with some embodiments, the apparatus is provided in a user terminal and the apparatus is used to implement the technical solution of hierarchical data reading in accordance with some embodiments, the apparatus 800 includes initialization unit 802, data receiving unit 804 and data displaying unit 806.

The initialization unit 802 receives an initialization request including the elements to be read; and sends a data reading request including the elements to be read, the elements on the same layer as the elements to be read and elements on the lower level.

The data receiving unit 804 receives and saves the feedback data, the saved data include the data corresponding to the elements to be read, the data corresponding to the elements on the same layer as the elements to be read, and the data corresponding to the elements on the lower level; and the data receiving unit 804 sends the data corresponding to the elements to be read to the data displaying unit.

The data displaying unit 806 displays the data corresponding to the elements to be read.

Preferably, the apparatus 800 further includes a lateral switching unit 808 for receiving the lateral switching request, which including lateral elements that selected from the elements on the same layer as the elements to be read. The lateral switching unit 808 queries whether there are data corresponding to the lateral elements being stored locally, if yes, extracts the data and sends the data to the data displaying unit, and sends a lateral reading request which includes elements on the lower level below the lateral elements, but not include elements with locally stored correspondent data.

The data receiving unit 804 is further used to receive and save the data corresponding to the elements that included in the lateral reading request.

The data displaying unit 806 is further used to switch and display the data from the lateral switching unit.

Preferably, the apparatus 800 further includes a downward vertical switching unit 810 for receiving a downward vertical switching request. The downward vertical switching unit 810 queries whether there are data corresponding to the downward vertical elements being stored locally, if yes, extracts the data and send the data to the data displaying unit, and sends a downward vertical reading request.

The data receiving unit 804 is further used to receive and save the data corresponding to the elements that included in the downward vertical reading request.

The data displaying unit 806 is further used to switch and display the data from the downward vertical switching unit.

Preferably, the apparatus 800 further includes an upward vertical switching unit 812 that receives an upward vertical switching request. The upward vertical switching unit 812 queries whether there are data corresponding to the upward vertical elements being stored locally, if yes, extracts the data and sends the data to the data displaying unit; otherwise, rejects the switching request.

The data displaying unit 806 is further used to switch and display the data from the upward vertical switching unit.

Preferably, the data receiving unit 804 includes a deleting sub-unit 814, for receiving exit instruction from the application, and deleting the stored data.

The user terminal may be particularly a mobile terminal (such as a smart phone or a tablet).

FIG. 9 is a flowchart of a method of presenting data stored at remote sources in accordance with some embodiments. The method is performed at a device having one or more processors and memory storing instructions for execution by the one or more processors.

In step 901, in accordance with some embodiments, a user terminal receives first webpage data that is configured to be rendered as a first webpage, the first webpage, when rendered, provides one or more access links each directed to respective second webpage data that is stored at a respective remote source.

In accordance with some embodiments, a user browses on internet and instructs a browser program to open a webpage. The browser requests from a server webpage data, which may be the html source code plus some resources (e.g., texts, images, audio data, video data) embedded in the webpage. The browser then displays a webpage loaded with the source code and the resources.

In some embodiments, a webpage is a document that is suitable to be opened by a web browser, which may be an existing browser, e.g., Chrome, Firefox, IE. A webpage includes a user interface for accessing a database, e.g., for displaying data retrieved using a particular database query, and the buttons for submitting particular database queries.

In some embodiments, a access link can be a button, a hyperlink, an icon, or any other visible object that when selected by a user, cause the user terminal to obtain some resources.

In accordance with some embodiments, in step 902, from the first webpage data, a user terminal recognizes respective reference data for each of the respective second webpage data that is stored at its respective remote source.

In some embodiments, the respective reference data for each of the second webpage data (i.e., each of the second webpages) is the URL of the second webpage data (i.e., the URL of the second webpage). In some embodiments, an access link can be displayed as a clickable hyperlink or a button. A distinction between reference data and an access link is that an access link is displayed in a webpage (e.g., a hyperlink) and reference data is used by the user terminal to retrieve other data (e.g., a URL).

In some embodiments, each second webpage may be located at a different remote source. In some embodiments, a remote source is a server of a website and/or a server of a database.

In step 903, in accordance with some embodiments, a user terminal determines whether to request the second webpage data in accordance with predetermined criteria.

There are various criteria of determining whether a particular link (or reference data) should be used to request the respective second webpage data. In various embodiments, the criteria may be combined with one another. In some embodiments, the purpose of the various criteria is to predict what link a user will select and therefore making the user terminal stay ahead of the user as often as possible but also acquiring unnecessary second webpage data as little as possible.

In some embodiments, the predetermined criteria include whether the first webpage data is received from the remote source. A webpage often contains some advertisements that a user typically will not select. Today, many advertisements contain links that lead to internet servers other than the server who maintains the first webpage. Avoiding pursuing links that lead to other servers or sources is a good way of avoiding advertisement content.

In these embodiments, the predetermined criteria include avoiding request data from links that are not displayed. In some embodiments, an advertisement interception algorithm is used to block advertisements. Avoiding hidden links therefore prevents downloading advertisements beforehand, which are typically of not interest to users. In addition, if a link is not displayed, a user will not intentionally select it. Therefore, if a first webpage includes reference data whose links are not displayed, the respective reference data is not used to request corresponding second webpage data.

In some embodiments, the predetermined criteria include a size or a type of the second webpage data. The specific process may include that the user terminal first queue the size or type of the second webpage data, which is often feasible when the remote source is a database. The specific criteria may be that avoiding a link when it leads to second webpage data that is bigger than 3 megabytes or that includes video type of data.

In some embodiments, predetermined criteria are at least partly derived from historical user activity. Historical user activity is more useful for webpages that a user has more historical visits and for simpler webpages than more complex ones. For example, if a user is reading an online novel, the user terminal recognizes that the user historically clicks a button (which is "next page") and acquires the second webpage data from the URL of the "next page" button before a user clicks it. For another example, if a user habitually clicks the "sports" and "politics" sections of the Washington Post, the user terminal may automatically acquires second webpage data from the links of "sports" and "politics" every time the home page of the Washington Post is loaded, and waiting for the user to click them.

In some embodiments, the predetermined criteria include bandwidth and stability of a current internet connection. The benefit of requesting second webpage data is reducing the waiting time of a user when the user opens the second webpage. Therefore, when the bandwidth of the current internet connection is low or that the connection is unstable, the need for requesting second webpage data increases. A user terminal can be set to open pre-requesting for second webpage data only when the internet connection is unstable or slow.

In some embodiments, the predetermined criteria include whether another access link is selected by the user. For example, a first webpage contains multiple access links, by the time of a user selecting one of them, the user terminal stops requesting data from all other links. When the internet connection is slow, it often takes some time from a user clicking a link to a second webpage is opened. This criterion avoids obtaining unnecessary data when a user has made a selection.

In accordance with some embodiments, in step 904, in accordance with the respective reference data for each of the respective second webpage data, the user terminal requests the respective second webpage data from its respective remote source before detecting a user's selection of the access link directed to the respective second webpage data in the first webpage.

In some embodiments, a user device sends a data reading request to a read-server, wherein the data reading request includes elements to be read, elements on the same layer and the lower level with respect to the elements to be read. These embodiments are elaborated in previous figures and will not be repeated here.

In step 905, in accordance with some embodiments, the user terminal receives and stores at least one of the respective second webpage data before detecting the user's selection of the access link directed to the at least one of the respective second webpage data in the first webpage.

In some embodiments, when the remote source receives multiple requests for webpage data, the remote source prioritizes the requests based on historical record of web visits. For example, a user terminal may send requests for multiple links on a first webpage, the remote source can use the historical record of web visits to better predict users' next move. When the remote source finds that 90% of users choose a particular one of the links from the first webpage, the remote source sends the second webpage corresponding to the particular link.

In some embodiments, the user terminal receives and saves the feedback data from the read-server, the saved data include the data corresponding to the elements to be read, the data corresponding to the elements on the same layer and the lower level with respect to the elements to be read. These embodiments are elaborated in previous figures and will not be repeated here.

In accordance with some embodiments, in step 906, upon detecting the user's selection of the access link directed to the at least one of the respective second webpage data in the first webpage, the user terminal renders the stored at least one of the respective second webpage data as a second webpage.

In other words, the received webpage data is stored by the user terminal, when the user selects an access link, the stored webpage data corresponding to the access link is displayed in a second webpage.

In some embodiments, after the first webpage is closed or replaced, the user terminal deletes the at least one of the second webpage data from storage. In some embodiments, webpage data is stored until the user closes the web browser or even longer, in case the user returns to the first webpage and tries to open another second webpage.

Figure 10:
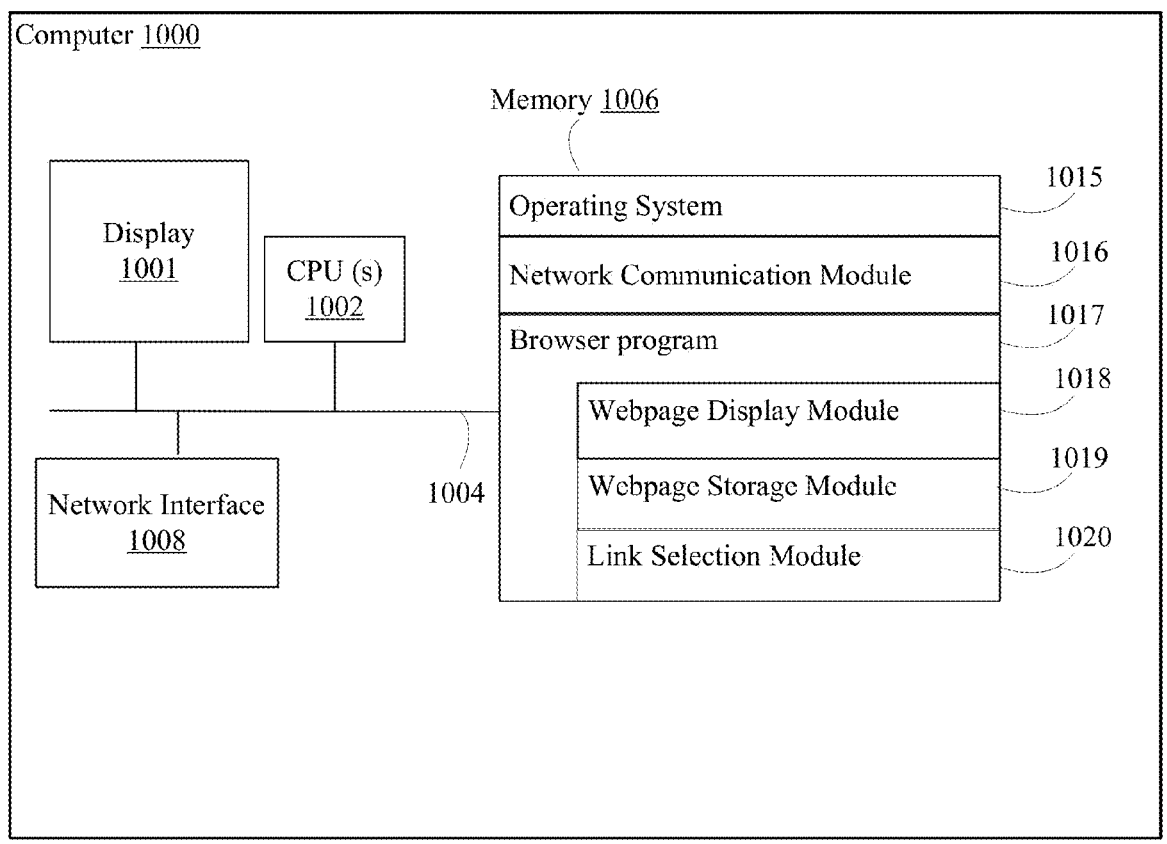
FIG. 10 is a schematic structural diagram of a device of presenting data stored at remote sources in accordance with some embodiments.

FIG. 10 is a diagram of an example implementation of a user terminal 1000 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the user terminal 1000 includes one or more processing units (CPU's) 1002, one or more network or other communications interfaces 1008, a display 1001, memory 1006, and one or more communication buses 1004 for interconnecting these and various other components. The communication buses may include circuitry (sometimes called a chipset) that interconnects and controls communications between system components. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 may optionally include one or more storage devices remotely located from the CPU(s) 1002. The memory 1006, including the non-volatile and volatile memory device(s) within the memory 1006, comprises a non-transitory computer readable storage medium.

In some implementations, the memory 1006 or the non-transitory computer readable storage medium of the memory 1006 stores the following programs, modules and data structures, or a subset thereof including an operating system 1015, a network communication module 1016, and a browser program 1017.

In accordance with some embodiments, the operating system 1015 includes procedures for handling various basic system services and for performing hardware dependent tasks.

In accordance with some embodiments, the network communication module 1016 facilitates communication with other devices via the one or more communication network interfaces 1008 (wired or wireless) and one or more communication networks, such as the internet, other wide area networks, local area networks, metropolitan area networks, and so on.

In accordance with some embodiments, the browser program 1017 is configured to obtain webpage data and display webpages. The browser program 1017 can be any of the popular browser, including Chrome, Firefox and IE. The browser program 1017 includes a webpage display module 1018, which is configured to display webpages. The browser program 1017 also includes a webpage storage module 1019, which is configured to store webpage data. In addition, in some embodiments, the browser program 1017 includes a link selection module 1020, which is configured to which link the browser program 1017 should obtain webpage data before a user selecting the link. The link selection module 1020 may be an add-on of the browser program or an independent program that works with the browser program 1017.

In some embodiments, the three modules work with data acquired from each other and from other modules in the browser program. For example, the link selection module 1020 may acquire, from the webpage display module 1018 and possibly an advertisement block module, data regarding what links are displayed to a user. The link selection module 1020, in turn, determines the webpage data that is obtained by the browser program 1017 and stores in the webpage storage module 1019. At last, the webpage storage module 1019 supplies webpage data to the webpage display module 1018, when the browser program 1017 detects a user's selection of a link. More details on how the three modules are described in other figures (particularly FIG. 9) and their accompanying text, and will not be repeated.

While particular embodiments are described above, it will be understood it is not intended to limit the disclosure to these particular embodiments. On the contrary, the technology includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the disclosure to the precise forms disclosed. Many modifications and variations are possible in view of the above teachings. The implementations were chosen and described in order to best explain principles of the technology and its practical applications, to thereby enable others skilled in the art to best utilize the technology and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of presenting data stored at remote source, comprising:
    at a device of having one or more processors and memory for storing one or more programs to be executed by the one or more processors:
        receiving first webpage data that is configured to be rendered as a first webpage, wherein:
            the first webpage provides data corresponding to a first information node in a first data hierarchy that has two or more horizontal layers and two or more vertical levels,
            the first webpage, when rendered, provides a plurality of access links each directed to respective second webpage data that is stored at a respective remote source,
            the plurality of access links include a first subset of access links to a first subset of the respective second webpage data that each correspond to a respective information node in the first data hierarchy other than the first information node, the plurality of access links include a second subset of access links to a second subset of the respective second webpage data that each correspond to a respective information node in a second data hierarchy that is distinct from the first data hierarchy and that includes two or more horizontal layers and two or more vertical levels;

from the first webpage data, recognizing respective reference data for each of the respective second webpage data that is stored at its respective remote source;

in accordance with the respective reference data for each of the respective second webpage data, requesting the respective second webpage data from its respective remote source before detecting a user's selection of the access link directed to the respective second webpage data in the first webpage, wherein requesting the respective second webpage data includes:

requesting the respective second webpage data corresponding to a respective information node in a next vertical level in the first data hierarchy below the first information node, and requesting the respective second webpage data corresponding to a respective information node in the second data hierarchy that is at the same horizontal layer as the first information node in the first information hierarchy;

receiving and storing at least one of the requested respective second webpage data before detecting the user's selection of the access link directed to the at least one of the requested respective second webpage data in the first webpage; and upon detecting the user's selection of the access link directed to the at least one of the requested respective second webpage data in the first webpage, rendering the stored at least one of the requested respective second webpage data as a respective second webpage.

2. The method of claim 1, further comprising:
before requesting the second webpage data, determining whether to request the second webpage data in accordance with predetermined criteria.

3. The method of claim 2, wherein the predetermined criteria include whether the first webpage data is received from the remote source.

4. The method of claim 2, wherein the predetermined criteria are at least partly derived from historical user activity.

5. The method of claim 2, wherein the predetermined criteria include bandwidth of a current internet connection.

6. The method of claim 1, further comprising:
after the first webpage is closed or replaced, deleting the at least one of the second webpage data from storage.

7. The method of claim 1, wherein the respective remote source for the at least one of the second webpage data is a web server.

8. The method of claim 1, wherein when the remote source receives multiple requests for webpage data, the remote source prioritizes the requests based on historical record of web visits.

9. The method of claim 1, wherein requesting the second webpage data from the remote source before detecting a user's selection of the reference data further comprises:
sending a data reading request to a read-server, wherein the data reading request includes elements to be read, elements on the same layer and the lower level with respect to the elements to be read.

10. The method of claim 1, wherein receiving and storing the second webpage data further comprises:
receiving and saving the feedback data from the read-server, the saved data include the data corresponding to the elements to be read, the data corresponding to the elements on the same layer and the lower level with respect to the elements to be read.

11. A device of presenting data stored at remote source, comprising:
one or more processors; and
memory storing one or more programs for execution by the one or more processors, the one or more programs including instructions for:
  receiving first webpage data that is configured to be rendered as a first webpage, wherein:
    the first webpage provides data corresponding to a first information node in a first data hierarchy that has two or more horizontal layers and two or more vertical levels,
    the first webpage, when rendered, provides a plurality of access links each directed to respective second webpage data that is stored at a respective remote source,
    the plurality of access links include a first subset of access links to a first subset of the respective second webpage data that each correspond to a respective information node in the first data hierarchy other than the first information node,
    the plurality of access links include a second subset of access links to a second subset of the respective second webpage data that each correspond to a respective information node in a second data hierarchy that is distinct from the first data hierarchy and that includes two or more horizontal layers and two or more vertical levels;
  from the first webpage data, recognizing respective reference data for each of the respective second webpage data that is stored at its respective remote source;
  in accordance with the respective reference data for each of the respective second webpage data, requesting the respective second webpage data from its respective remote source before detecting a user's selection of the access link directed to the respective second webpage data in the first webpage, wherein requesting the respective second webpage data includes:
    requesting the respective second webpage data corresponding to a respective information node in a next vertical level in the first data hierarchy below the first information node, and
    requesting the respective second webpage data corresponding to a respective information node in the second data hierarchy that is at the same horizontal layer as the first information node in the first information hierarchy;
  receiving and storing at least one of the requested respective second webpage data before detecting the user's selection of the access link directed to the at least one of the requested respective second webpage data in the first webpage; and
  upon detecting the user's selection of the access link directed to the at least one of the requested respective second webpage data in the first webpage, rendering the stored at least one of the requested respective second webpage data as a respective second webpage.

12. The device of claim 11, wherein the one or more program modules further include instructions for:
before requesting the second webpage data, determining whether to request the second webpage data in accordance with predetermined criteria.

13. The device of claim 11, wherein the predetermined criteria are at least partly derived from historical user activity.

14. The device of claim 11, wherein the one or more program modules further include instructions for:
receiving the first webpage data, rendering the first webpage data as the first webpage.

15. The device of claim 11, wherein the one or more program modules further include instructions for:
after the first webpage is closed or replaced, deleting the at least one of the second webpage data from storage.

16. The device of claim 11, wherein the respective remote source for the at least one of the second webpage data is a web server.

17. The device of claim 11, wherein when the remote source receives multiple requests for webpage data, the remote source prioritizes the requests based on historical record of web visits.

18. The device of claim 11, wherein requesting the second webpage data from the remote source before detecting a user's selection of the reference data further comprises:
sending a data reading request to a read-server, wherein the data reading request includes elements to be read, elements on the same layer and the lower level with respect to the elements to be read.

19. The device of claim 11, wherein receiving and storing the second webpage data further comprises:
receiving and saving the feedback data from the read-server, the saved data include the data corresponding to the elements to be read, the data corresponding to the elements on the same layer and the lower level with respect to the elements to be read.

20. A non-transitory computer readable storage medium having instructions stored thereon, the instructions, when executed by one or more processors, cause the processors to perform operations comprising:
receiving first webpage data that is configured to be rendered as a first webpage, wherein:
the first webpage provides data corresponding to a first information node in a first data hierarchy that has two or more horizontal layers and two or more vertical levels,
the first webpage, when rendered, provides a plurality of access links each directed to respective second webpage data that is stored at a respective remote source,
the plurality of access links include a first subset of access links to a first subset of the respective second webpage data that each correspond to a respective information node in the first data hierarchy other than the first information node,
the plurality of access links include a second subset of access links to a second subset of the respective second webpage data that each correspond to a respective information node in a second data hierarchy that is distinct from the first data hierarchy and that includes two or more horizontal layers and two or more vertical levels;
from the first webpage data, recognizing respective reference data for each of the respective second webpage data that is stored at its respective remote source;
in accordance with the respective reference data for each of the respective second webpage data, requesting the respective second webpage data from its respective remote source before detecting a user's selection of the access link directed to the respective second webpage data in the first webpage, wherein requesting the respective second webpage data includes:
requesting the respective second webpage data corresponding to a respective information node in a next vertical level in the first data hierarchy below the first information node, and
requesting the respective second webpage data corresponding to a respective information node in the second data hierarchy that is at the same horizontal layer as the first information node in the first information hierarchy;
receiving and storing at least one of the requested respective second webpage data before detecting the user's selection of the access link directed to the at least one of the requested respective second webpage data in the first webpage; and
upon detecting the user's selection of the access link directed to the at least one of the requested respective second webpage data in the first webpage, rendering the stored at least one of the requested respective second webpage data as a respective second webpage.

* * * * *